March 11, 1924. 1,486,274
R. BACHMAN
DRIVING MECHANISM FOR SLICING MACHINES
Filed July 22, 1922
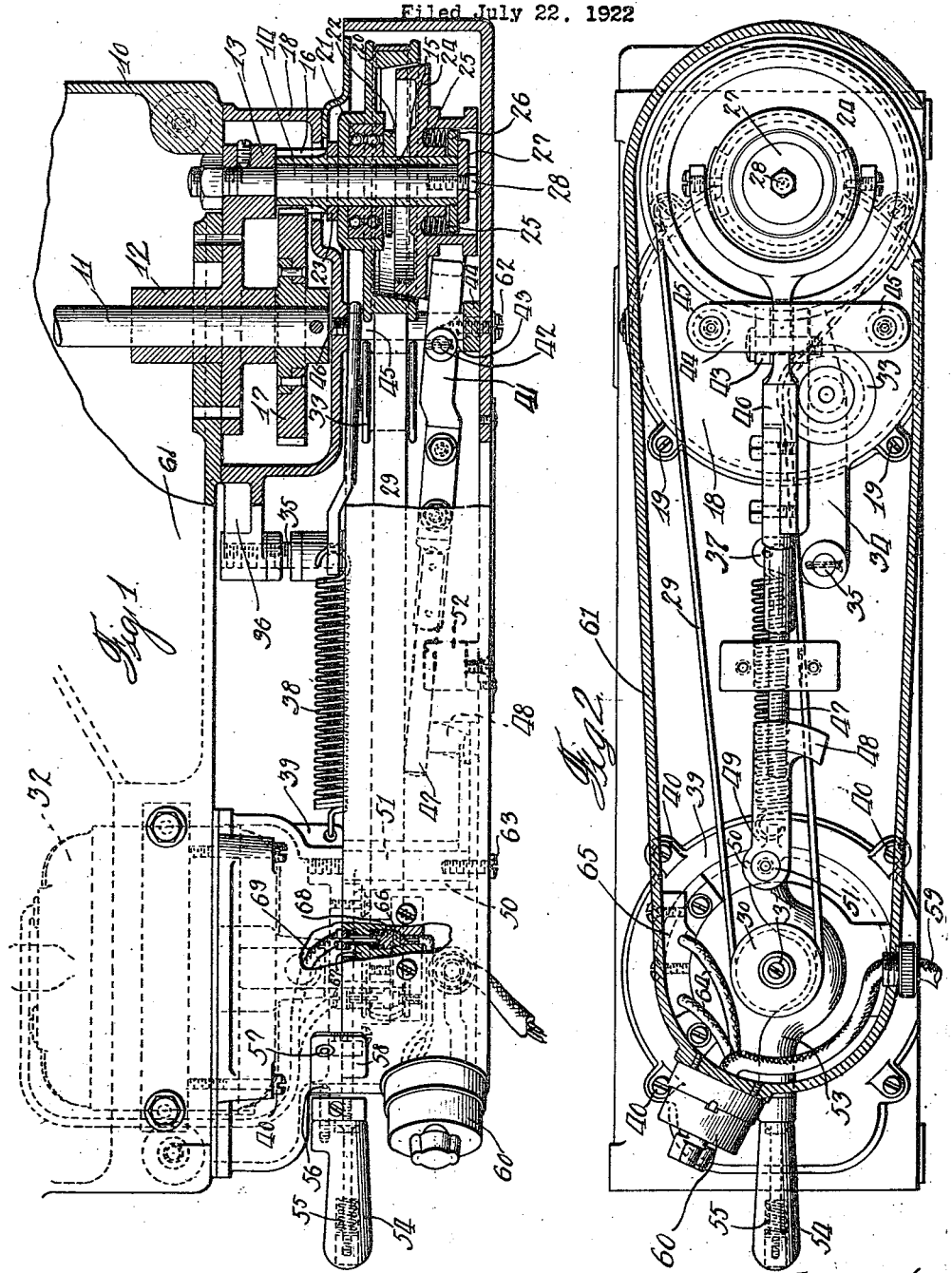
Inventor
Rudolph Bachman Patented Mar. 11, 1924.                                                          1,486,274

UNITED STATES PATENT OFFICE.

RUDOLPH BACHMAN, OF LAPORTE, INDIANA, ASSIGNOR TO U. S. SLICING MACHINE COMPANY, OF LAPORTE, INDIANA, A CORPORATION OF INDIANA.

DRIVING MECHANISM FOR SLICING MACHINES.

Application filed July 22, 1922. Serial No. 576,681.

*To all whom it may concern:*

Be it known that I, RUDOLPH BACHMAN, a citizen of the United States, residing at Laporte, in the county of Laporte, and State of Indiana, have invented certain new and useful Improvements in Driving Mechanism for Slicing Machines, of which the following is a specification.

This invention relates to a power drive for slicing machines and has for its object the provision of mechanism of the class named which shall be of improved construction and operation.

The invention is exemplified in the combination and arrangement of parts shown in the accompanying drawing and described in the following specification, and it is more particularly pointed out in the appended claims.

In the drawing—

Fig. 1 is a top plan view of a portion of a slicing machine having one embodiment of the present invention applied thereto; and Fig. 2 is an elevation of the device shown in Fig. 1, with parts in section.

In Patent No. 1,310,197, granted July 15, 1919, mechanism is shown by which a slicing machine is operated from an electric motor and the present invention is in the nature of an improvement on the mechanism of that patent.

Referring more particularly to the drawing, the numeral 10 designates a portion of a slicing machine frame having a drive shaft 11 mounted in a bearing 12. Integral with the bearing 12 is a socket 13 in which a stud shaft 14 is mounted. A sleeve 15 is journaled on the shaft 14 and provided with a pinion 16 which meshes with a spur gear 17 secured to the drive shaft 11. The gears 16 and 17 are enclosed in a housing 18 which is fastened to the frame 10 by screws 19. A pulley 20 is journaled on the sleeve 15 in front of the housing 18 and is provided with ball bearings 21 and collars 22 and 23 for holding it in place. A friction clutch member 24 cooperates with the inner face of the pulley 20, the clutch member 24 being splined on the sleeve 15 and resiliently pressed into operative engagement with the pulley by springs 25. The springs 25 bear against a flange 26 secured to the end of the sleeve 15 and a washer plate 27 is connected with the stud shaft 14 by a bolt 28 and holds the sleeve 15 in place on the stud shaft. The pulley 20 is operated by a belt 29 driven by a pulley 30 secured to the shaft 31 of an electric motor 32. A tightener for the belt 29 comprises an idler 33 mounted on an arm 34 which is pivoted on a stud 35. The stud 35 is supported by a bracket 36 on the casing 14 and the arm 34 is provided with an angular projection 37 having a spring 38 connected therewith, the opposite end of the spring 38 being secured to a housing 39 for the outer end of the motor 32. The housing 39 is connected with the frame 10 by screws 40.

The clutch 24 is controlled by a lever 41 pivotally mounted at 42 on lugs 43 which are formed on the inner face of a bar 44. The bar 44 is supported by a pair of pins 45, the ends of which are threaded into the casing 18, as shown at 46. The lever 40 is provided with an extension 47 which engages a wedge member 48 carried on an arm 49 formed integral with a sleeve 50, the sleeve being pivotally mounted on a pin 51 projecting forwardly from the casing 39. A bracket 52 engages the extension 47 to prevent vertical displacement of the lever when operated by the wedge member 48. The sleeve 50 is provided with a hand lever 53 having a grip 54 by which the lever may be oscillated to move the cam wedge 48. When the grip 54 is lifted the wedge 48 will be pressed downwardly to move the extension 47 inwardly and free the clutch 24 from the pulley 20. Movement of the hand lever in the opposite direction will release the extension 47 from the cam 48 and permit the springs 25 to force the clutch 24 into operative engagement with the pulley 20. When the clutch and pulley are in operative connection and the motor 32 is running, the pulley will rotate the clutch member and consequently the sleeve 15, thus driving the main shaft 11 through gears 16 and 17.

In starting the machine the current will be turned on and when the motor has reached its full speed the friction clutch will be gradually brought into operation so that the machine may be brought up to speed without subjecting the motor to a sudden load. The grip 54 is provided with a spring 55 which presses the grip inwardly to move a pin 56 carried by the grip into engagement with openings 57 in a plate 58 for the purpose of holding the lever 53 in its different positions of adjustment. The pin 56 may be disengaged from the openings 57 by drawing outwardly on the grip 54.

Current is supplied to the motor 32 from a circuit 59 controlled by a switch 60 which is mounted on a detachable cover or housing 61. The housing 61 is secured to the pins 45 and 51 by screws 62 and 63, respectively. Lead wires 64 extend from the switch 60 to a terminal block 65 secured to the housing 61 and provided with contact members 66. A complementary block 67 is mounted on the housing 31 and provided with spring-pressed contacts 68 which engage the contacts 66 and complete the circuit to the motor 32 through lead wires 69. It will be apparent that when the cover 61 is removed the butt end contacts 66 and 68 will be separated from one another, and when the cover is replaced, electrical connection with the motor will be re-established automatically.

I claim:—

1. The combination with a slicing machine frame, of a drive shaft journaled in said frame, a motor mounted in said frame, a stud shaft mounted on said frame and having a sleeve journaled thereon, gearing connecting said drive shaft and sleeve, a pulley journaled on said sleeve, a friction clutch member splined on said sleeve, a belt connecting said motor and pulley, and a hand lever for controlling said friction clutch.

2. The combination with a slicing machine frame, of a drive shaft journaled in said frame, a pulley for actuating said drive shaft, a belt extending parallel with the side of said frame for driving said pulley, a casing for said belt, a friction clutch for connecting said pulley and drive shaft, and a lever mounted in said casing and projecting therefrom for controlling said friction clutch.

3. The combination with a slicing machine frame, of a shaft journaled in said frame and projecting from one side thereof, a pulley for driving said shaft, a friction clutch for connecting said shaft and pulley, a motor mounted in said frame and spaced from said shaft, a belt connecting said motor and pulley, a removable cover for enclosing said belt, a lever pivoted on said cover for controlling said friction clutch, a hand lever provided with a cam for actuating said first-mentioned lever, and a grip projecting from said casing for moving said levers.

4. The combination with a slicing machine frame, of a drive shaft journaled within said frame and projecting from one side thereof, a gear mounted on said drive shaft, a stud shaft secured to said frame and having a sleeve thereon provided with a pinion which meshes with said gear, a pulley journaled on said sleeve, a friction clutch member splined on said sleeve for connecting said sleeve and pulley, springs for causing said clutch member to engage said pulley, and a lever for releasing said clutch member.

5. The combination with a slicing machine frame, of a drive shaft journaled in said frame, a rotary sleeve for actuating said drive shaft, said sleeve having a pulley journaled thereon, a friction clutch member splined on said sleeve for engaging said pulley, resilient means for moving said clutch and pulley into operative relation, a belt for driving said pulley, a motor mounted in said slicing machine frame for driving said belt, a tightener for said belt, a housing for said belt and pulley, a lever pivoted on said housing for controlling said clutch member, a second lever pivoted in said housing for actuating said first-mentioned lever, and a hand grip connected with said second-mentioned lever and extending from said housing at the end thereof opposite said clutch member.

6. The combination with a slicing machine frame, of a drive shaft journaled in said frame and projecting therefrom, a motor mounted in said frame and having a shaft extending substantially parallel with said drive shaft and spaced therefrom, a belt for connecting said motor and drive shaft, a friction clutch interposed between said belt and drive shaft, and lever mechanism for controlling said clutch, said lever mechanism having a hand grip positioned adjacent said motor.

7. The combination with a slicing machine frame, of a drive shaft journaled in said frame adjacent one end thereof, a motor mounted in said frame adjacent the opposite end thereof, a belt for actuating said drive shaft from said motor, a friction clutch adjacent said drive shaft for controlling the connection between said shaft and motor, a handle adjacent said motor for controlling said clutch, and a switch adjacent said motor for controlling the current supplied thereto.

8. The combination with a slicing machine frame, of a drive shaft journaled therein, a motor mounted in said frame for actuating said drive shaft, means for transmitting power from said motor to said drive shaft, a detachable cover for said power transmitting means, an electric circuit for supplying power to said motor, and co-operating contact members on said frame and cover and forming a part of said electric circuit, said contract members being separable when said cover is removed from said frame.

9. The combination with a slicing machine frame having a motor mounted therein, of power transmitting mechanism actuated by said motor, a housing for said power transmitting mechanism, an electric circuit for said motor, a switch mounted on said housing for controlling said circuit, and complementary contact members for said circuit mounted on said frame and housing, said contact members being separable from one another when said housing is removed from said frame.

10. The combination with a slicing machine frame, of a drive shaft journaled in said frame, a motor mounted in said frame in spaced relation to said drive shaft, gearing for actuating said drive shaft, a detachable housing for said gearing, a detachable housing for said motor, a friction clutch positioned outside of said gear housing for actuating said gearing, a pulley positioned outside of said motor housing and operated by said motor, a belt connecting said pulley and friction clutch, and a detachable cover member for said pulley, belt and clutch.

11. The combination with a slicing machine frame, of a drive shaft journaled in said frame, a motor mounted in said frame in spaced relation to said drive shaft, gearing for actuating said drive shaft, a detachable housing for said gearing, a detachable housing for said motor, a friction clutch positioned outside of said gear housing for actuating said gearing, a pulley positioned outside of said motor housing and operated by said motor, a belt connecting said pulley and friction clutch, a detachable cover member for said pulley, belt and clutch, a lever mounted in said cover member for controlling said clutch, and an electric switch mounted on said cover member for controlling said motor.

In testimony whereof I have signed my name to this specification on this 11th day of July, A. D. 1922.

RUDOLPH BACHMAN.